(12) United States Patent
McCurdy

(10) Patent No.: US 11,629,991 B2
(45) Date of Patent: Apr. 18, 2023

(54) ASPECT RATIO FLOW METERING DEVICE AND METHODS OF USING

(71) Applicant: DuBois Chemicals, Inc., Sharonville, OH (US)

(72) Inventor: Brent McCurdy, Bryn Athyn, PA (US)

(73) Assignee: DuBois Chemicals, Inc., Sharonville, OH (US)

( * ) Notice: Subject to any disclaimer, the term of this patent is extended or adjusted under 35 U.S.C. 154(b) by 163 days.

(21) Appl. No.: 16/870,404

(22) Filed: May 8, 2020

(65) Prior Publication Data

US 2020/0355541 A1    Nov. 12, 2020

Related U.S. Application Data

(60) Provisional application No. 62/846,174, filed on May 10, 2019.

(51) Int. Cl.
| | | |
|---|---|---|
| *G01F 25/10* | (2022.01) | |
| *G01F 1/84* | (2006.01) | |

(52) U.S. Cl.
CPC ............. *G01F 25/13* (2022.01); *G01F 1/8413* (2013.01)

(58) Field of Classification Search
CPC ................................ G01F 25/13; G01F 1/8413
USPC .......................................................... 73/1.16
See application file for complete search history.

(56) References Cited

U.S. PATENT DOCUMENTS

| | | | |
|---|---|---|---|
| 2,737,413 A |  | 3/1956 | Mitchison et al. |
| 4,862,837 A | * | 9/1989 | Holmes ................... F02M 21/12 123/23 |
| 5,301,718 A | * | 4/1994 | Bolhofner ............... B01F 25/31 137/526 |
| 5,356,076 A |  | 10/1994 | Bishop |
| 2007/0137716 A1 | * | 6/2007 | Stoops ..................... A62C 5/02 239/10 |
| 2011/0315229 A1 | * | 12/2011 | Linder .................. B01L 3/0293 137/1 |

(Continued)

*Primary Examiner* — John Fitzgerald
*Assistant Examiner* — Rodney T Frank
(74) *Attorney, Agent, or Firm* — Dinsmore & Shohl LLP

(57) ABSTRACT

An aspect ratio flow metering device may comprise a concentrate inlet portion, one or more restricted flow portions of tubing fluidly connected to the concentrate inlet portion, and a metered concentrate outlet portion fluidly connected to the one or more restricted flow portion of tubing. The narrowest part of the one or more restricted flow portions of tubing may each have a length ($R_L$): inner diameter ($R_{ID}$) ratio of at least 10:1. The metered concentrate outlet portion may have an inner diameter ($O_{ID}$) greater than $R_{ID}$. The concentrate inlet portion may have an inner diameter ($I_{ID}$) greater than $R_{ID}$. The aspect ratio flow metering device may be structurally configured to limit flow of a concentrate into a hydrodynamic mixing apparatus. Also disclosed are methods for using the aspect ratio flow metering device to mix fluids.

14 Claims, 5 Drawing Sheets

(56) References Cited

U.S. PATENT DOCUMENTS

2013/0239992 A1* 9/2013 Detrick .................... B60S 3/04
                                                                                                 92/5 R
2017/0045255 A1* 2/2017 Karamanos .............. F24F 11/30

* cited by examiner

ASPECT RATIO FLOW METERING DEVICE AND METHODS OF USING

CROSS-REFERENCE TO RELATED APPLICATION

This application claims priority to U.S. Provisional Application Ser. No. 62/846,174, filed May 10, 2019, which is hereby incorporated by reference in its entirety.

BACKGROUND

Mixing concentrated chemicals ("concentrates") with solvent or "diluent" solutions in a controlled manner is a long studied problem. One of the most common methods of mixing concentrates with diluents is to use a Venturi mixer. Venturi mixers generally have a constriction which operates to increase the velocity and decrease the pressure of the flowing diluent. This low pressure creates a driving force which pulls the concentrate into the flowstream. Turbulent conditions within the flowstream then operate to mix the diluent and the concentrate.

While this process is effective, far too much concentrate may enter the flowstream unless modifications are made to control the flowrate of the concentrate. Many methods have been tried previously to control flow including placing valves in the concentrate flowstream and introducing air to the concentrate flowstream, thus decreasing the driving force on the concentrate.

The most popular method of controlling concentrate flowrates is through the use of a "metering tip." These metering tips are positioned between a concentrate supply tank and the concentrate inlet of a venturi mixer. Structurally, the interior of a metering tip includes a relatively thin plate structure which chokes off flow through the pipe. Flow is then redirected through an opening or "orifice" in the center of the plate structure. These metering tips vary in orifice sizes, with increased orifice sizes leading to greater flowrates of chemical concentrate into the diluent flow stream.

Due to environmental and fiscal concerns, the concentration of the concentrates has drastically increased in recent years. This increased concentration has led to ever smaller orifices within the metering tips being required to achieve a desired mixed concentration. One consequence of these ever smaller orifices is an increased propensity for clogging. Current orifices are on the order of 0.006 inches (in) or smaller. At these sizes, any number of small obstructions can easily clog the orifice. For example, the orifices can be clogged by crystallized concentrate, dead bugs which landed in the concentrate, or even sand and dust particles.

Accordingly, solutions which enable precise control of concentrate flowrates without requiring the use of such small orifices are highly desirable.

SUMMARY

According to some embodiments of the present disclosure, an aspect ratio flow metering device may comprise a concentrate inlet portion, one or more restricted flow portions of tubing, and a metered concentrate outlet portion. The one or more restricted flow portions of tubing may be fluidly connected to the concentrate inlet portion. The metered concentrate outlet portion may be fluidly connected to the one or more restricted flow portion of tubing. The narrowest part of the one or more restricted flow portions of tubing may each have a length ($R_L$): inner diameter ($R_{ID}$) ratio of at least 10:1. The metered concentrate outlet portion may have an inner diameter (Op) greater than $R_{ID}$. The concentrate inlet portion may have an inner diameter ($I_{ID}$) greater than $R_{ID}$. The aspect ratio flow metering device may be structurally configured to limit flow of a concentrate into a hydrodynamic mixing apparatus.

According to some embodiments of the present disclosure, a method of making a cleaning solution may comprise passing a diluent through a diluent inlet portion of a Venturi mixer, passing a concentrate through the concentrate inlet portion of the aspect ratio flow metering device, mixing the concentrate with the diluent to generate the cleaning solution, and discharging the cleaning solution through a mixed fluid outlet.

According to some embodiments of the present disclosure, a mechanical vehicular wash may comprise a vehicle entrance leading into a vehicle washing station, a sprayer disposed within the vehicle washing station, a concentrate supply tank, a water supply channel, and an aspect ratio flow metering device. The diluent inlet portion may be fluidly connected to the water supply channel. The concentrate inlet portion of the aspect ratio flow metering device may be fluidly connected to the concentrate supply tank. The mixed fluid outlet portion of the Venturi mixer may be fluidly connected to the sprayer.

According to some embodiments of the present disclosure, an aspect ratio flow metering device may comprise a concentrate inlet portion, one or more restricted flow portions of tubing, a metered concentrate outlet portion, and a Venturi mixer. The one or more restricted flow portions of tubing may be fluidly connected to the concentrate inlet portion. The metered concentrate outlet portion may be fluidly connected to the restricted flow portion of tubing. The Venturi mixer may comprise a metered concentrate inlet portion. The metered concentrate inlet portion may be fluidly connected to the metered concentrate outlet portion of the restricted flow portion of tubing. The narrowest part of the one or more restricted flow portions of tubing may each have a length ($R_L$): inner diameter ($R_{ID}$) ratio of at least 10:1. The metered concentrate outlet portion may have an inner diameter ($O_{ID}$) greater than $R_{ID}$. The metered concentrate inlet portion may have an inner diameter ($I_{ID}$) greater than $R_{ID}$. The aspect ratio flow metering device may be structurally configured to limit flow of a concentrate into a hydrodynamic mixing apparatus. The metered concentrate outlet of the aspect ratio flow metering device may be fluidly connected to a concentrate inlet of the Venturi mixer.

DETAILED DESCRIPTION

Figure 1:
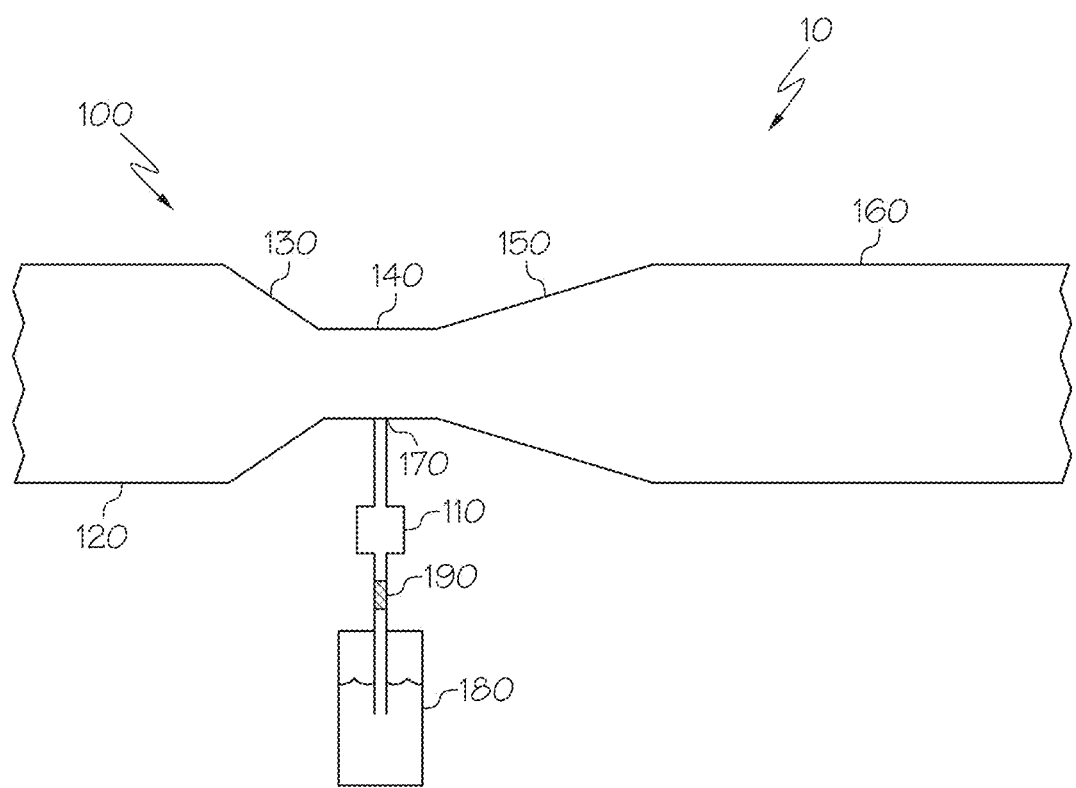
FIG. 1 depicts a flow metering device coupled to a Venturi hydrodynamic mixing apparatus

Embodiments of the present disclosure are directed to a systems and method for mixing concentrated solutions and diluents to produce a cleaning solution suitable for dispensing in various applications, for example, in a car wash environment. As depicted in FIG. 1, the system 10 may comprise a flow metering device 110 used to control the flow of concentrates into a hydrodynamic mixing apparatus 100. The system 10 may include a concentrate supply tank 180.

It should be understood that the flow metering device of the present disclosure may be used with any hydrodynamic mixing apparatus. Various embodiments are considered suitable for the hydrodynamic mixing apparatus. In some embodiments, the hydrodynamic mixing apparatus may include a Venturi mixer 100. The Venturi mixer 100 may include a diluent inlet portion 120 which tapers from a converging portion 130 into a throat portion 140. The throat portion 140 may then flare through diverging portion 150 to a mixed fluid outlet 160. A metered concentrate inlet 170 portion may connect the throat portion 140 to the flow metering device 110.

Without being limited by theory, the Venturi mixer 100 operates by passing a fluid through the diluent inlet portion 120 into the converging portion 130 and further into the throat portion 140. According to the Bernoulli principle, as the fluid velocity increases, the fluid pressure decreases. This decreased fluid pressure in the throat portion 140 is coupled to the fluid pressure in the metered concentrate inlet 170, thus exerting a driving force and pulling concentrate into the flowstream in the throat portion. While the Venturi mixer 100 shown is a simple embodiment, simpler embodiments may exist. For example, the Venturi mixer may still function with one or both of the converging portion 130 and the diverging portion 150 being truncated. More complicated Venturi mixers 100 may also exist. For example, there may be multiple metered concentrate inlet portions 170.

In alternate embodiments, the hydrodynamic mixing apparatus 110 may not be a Venturi mixer. In such embodiments, the hydrodynamic mixing apparatus 110 may not create a pressure drop along the metered concentrate inlet portion 170 or may not crease a sufficient pressure drop along the metered concentrate inlet portion 170 to draw the desired quantity of concentrate into the diluent flow stream. For example, the hydrodynamic mixing apparatus 110 may be a standard pipe fitting, such as a T-fitting. In such embodiments, a metering pump may be used to ensure sufficient driving force to cause the concentrate to enter the diluent flow stream. Suitable metering pumps include peristaltic pumps, water powered dosing pumps, syringe pumps, and diaphragm pumps. In embodiments where a pump is used, it may be positioned upstream of the concentrate inlet portion 330, 430.

The metered concentrate outlet portions 220, 320, 420 of the flow metering device 110 may be hydraulically connected to the metered concentrate inlet 170 of the hydrodynamic mixing apparatus 110.

Figure 2A:
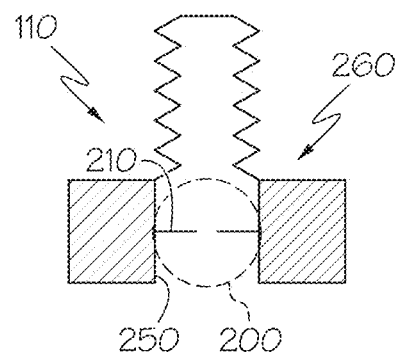
FIG. 2A depicts an orifice plate flow metering device
Figure 2B:
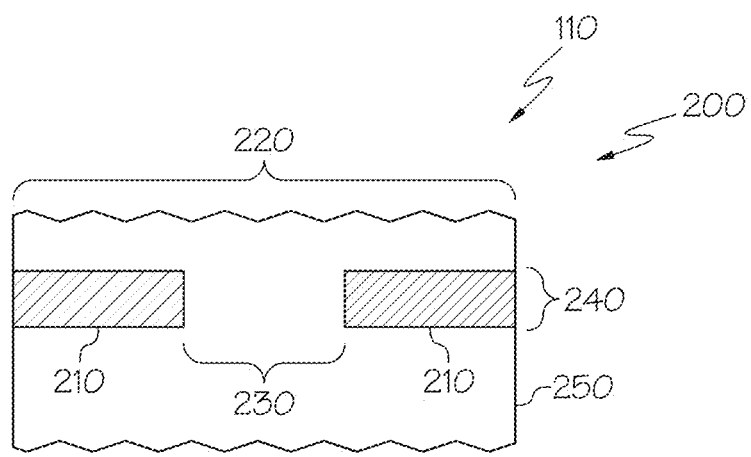
FIG. 2B depicts a further view of the orifice plate flow metering device

Flow metering devices 110 may be any device used to control the flowrate of concentrate into the hydrodynamic mixing apparatus. A variety of devices have been proposed to limit the flowrate of concentrates into hydrodynamic mixing apparatuses 110 including orifice plates, valves, and pressure relieving devices. Conventional flow metering devices such as the "metering tip" flow metering device 260 depicted in FIGS. 2A and 2B may be used to limit the flow of the concentrate solution into the hydrodynamic mixing apparatus 100. Such metering tips 260 generally include an orifice plate flow metering device 200. The orifice plate flow metering device 200 may comprise of an orifice plate 210. The orifice plate 210 may be situated in a tube 250 of diameter 220. The tube 250 is positioned as part of a concentrate supply flowpath between the metered concentrate inlet 170 and the concentrate supply tank 180. It should be understood that concentrate supply flowpath may be a plurality of tubes joined by welds, fittings, or flanges. The concentrate supply flowpath may include other components such as valves, filters, and degassers. The orifice plate may be built into the tube or may be replaceable, such as by clamping in between two flanges. The orifice plate 210 may have an orifice with an orifice diameter 230, and length 240. Generally, such orifice plates may have an orifice plate thickness 240:orifice diameter 230 ratio of from 2:1 to 1:1000. Without being limited by theory, it is believed that nearly all of the flow resistance in orifice plates is derived from the orifice diameter 230. Thus, exceedingly small orifice diameters 230 (on the order of 0.01 in or smaller) may be required to achieve desired flowrates. These small orifice diameters may lead to clogging and unexpected flow conditions. This problem has recently become more pronounced due to increased concentrations of concentrated solutes. These small orifices may become clogged by crystallized concentrate particles, insect carcasses, sand, and even dust. It is therefore desired to develop a flow metering device 110 which is capable of achieving the same low flowrates of concentrate without requiring such small openings.

Figure 3:
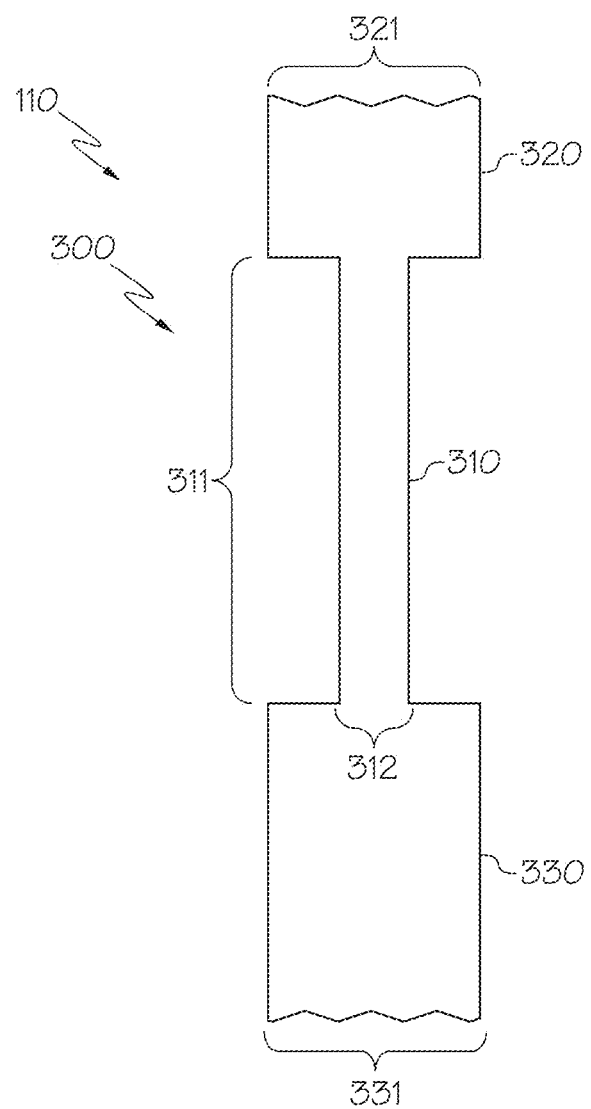
FIG. 3 depicts an embodiment of a single tube aspect ratio flow metering device.
Figure 4:
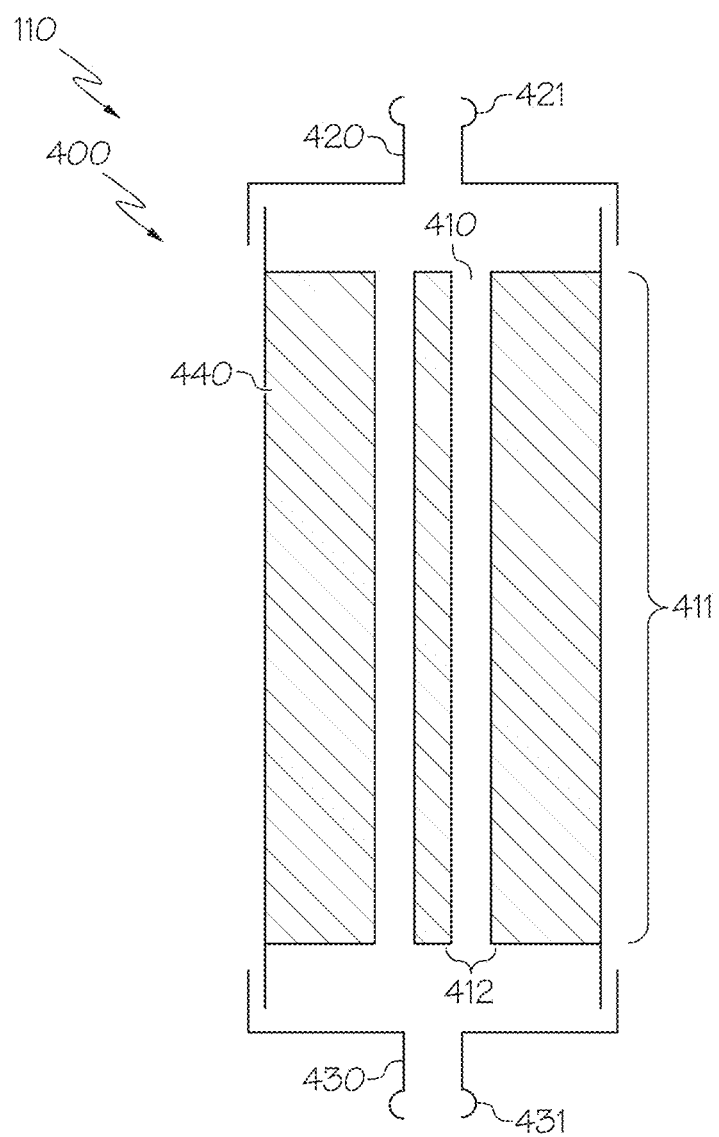
FIG. 4 depicts an embodiment of a parallel tube aspect ratio flow metering device.

As depicted in FIGS. 3 and 4, the flow metering device 110 may comprise an aspect ratio flow metering device 300, 400. The aspect ratio flow metering device 300, 400 may comprise a concentrate inlet portion 330, 430 which is hydraulically connected to the one or more restricted flow portions 310, 410. The one or more restricted flow portions 310, 410 are hydraulically connected to a metered concentrate outlet portion 320, 420.

The narrowest part of the one or more restricted flow portions of tubing 310, 410 may each have a restricted flow portion length 311, 411 ($R_L$): restricted flow portion inner diameter 312, 412 ($R_{ID}$) ratio of at least 10:1. As is discussed hereinabove, the aspect ratio flow metering device 300, 400 is believed to operate by providing a relatively long and narrow tube (the "restricted flow portion of tubing:" 310, 410) through which the concentrate is required to flow during operation of the system 10. While the $R_L$: $R_{ID}$ ratio of 10:1 may be taken as a minimum, the ratio may be much higher. Increasing ratios of $R_L$:$R_{ID}$ will lead to lower flowrates of concentrate, all else being constant. The $R_L$: $R_{ID}$ ratio may be at least 15:1, at least 20:1, at least 30:1, at least 40:1, at least 50:1 or at least 75:1, at least 100:1, at least 150:1, at least 200:1, at least 300:1, at least 500:1, at least 750:1, or at least 1000:1. The $R_L$: $R_{ID}$ ratio may be from 10:1 to 1000:1, from 10:1 to 500:1, from 10:1 to 250:1, from 10:1 to 100:1, from 10:1 to 50:1, from 50:1 to 1000:1, from 50:1 to 500:1, from 50:1 to 250:1, from 50:1 to 100:1, from 100:1 to 1000:1, from 100:1 to 500:1, from 100:1 to 250:1, from 10:1 to 1000:1, from 50:1 to 10000:1, from 250:1 to 10000:1, or any combination thereof. It should be understood that the degree of flow metering provided by the device is a function of the $R_L$: $R_{ID}$ ratio, as well as the absolute values of $R_L$ and $R_{ID}$.

The metered concentrate outlet portion 320, 420 of the aspect ratio flow metering device 300, 400 may have an inner diameter 321, 421 ($O_{ID}$) greater than $R_{ID}$ 312, 412. The concentrate inlet portion 330, 430 may have an inner diameter 331, 431 ($I_{ID}$) greater than $R_{ID}$ 312, 412. The ratio of $O_{ID}:R_{ID}$ may be greater than 1.5:1, 2:1, 3:1, 4:1, 5:1, 10:1, 15:1, 20:1, or even greater than 20:1.

Referring to FIGS. 1, 3, and 4, the aspect ratio flow metering device 110, 300, 400 may be structurally configured to limit flow of a concentrate into a hydrodynamic mixing apparatus 100. For example, the flow of concentrate may be reduced by more than 10%, 20%, 30%, 40%, 50%, 60%, 70% 80%, or 90%, relative to the same system without the aspect ratio flow metering device in place.

Without being limited by theory, the increased length of the restricted flow portions of the aspect ratio flow metering devices of the present disclosure relative to the thickness of conventional orifice plates is believed to limit the flow of concentrate through the aspect ratio flow metering device by increasing resistance between the fluid and the internal walls of the aspect ratio flow metering device. Such construction allows for wider restricted flow portions of tubing 310, 410 relative to orifice diameters 230. The wider tubing may help prevent clogging, especially as concentrate concentrations increase.

$R_L$ (the length of the restricted flow portion of tubing 311,411) may be from 1 inches (in) to 100 in. For example, $R_L$ may be from 1 in to 90 in, 1 in to 80 in, 1 in to 70 in, 1 in to 60 in, 1 in to 50 in, 1 in to 40 in, 1 in to 30 in, 1 in to 20 in, 1 in to 10 in, 5 in to 50 in, 5 in to 25 in, 5 in to 10 in, 10 in to 100 in, 10 in to 80 in, 10 in to 60 in, 10 in to 40 in, 10 in to 20 in, 20 in to 100 in, 20 in to 80 in, 20 in to 60 in, 20 in to 40 in, or any combination thereof.

$R_{ID}$ (the internal diameter of the restricted flow portion of tubing 312, 412) may be between 0.020 in and 0.1 in. For example, $R_{ID}$ may be from 0.020 in to 0.08 in, 0.020 in to 0.06 in, 0.020 in to 0.04 in, 0.020 in to 0.03 in, 0.03 in to 0.1 in, 0.03 in to 0.08 in, 0.03 in to 0.06 in, 0.03 in to 0.04 in, or any combination thereof.

As depicted in FIG. 4, the flow metering device 110 may comprise more than one restricted flow portions of tubing 410 arranged in parallel. Such embodiments may be referred to as a parallel tube aspect ratio flow metering device 400. Arranging multiple restricted flow portions of tubing 410 in parallel is believed to result in more consistent flowrates through the flow metering device relative to increased $R_{ID}$ values or decreased $R_L$ values, at a given target flowrate. Further, having multiple tubes arranged in parallel results in improved reliability by having multiple pathways in case one gets blocked. The parallel tube aspect ratio flow metering device 400 may comprise 2, 3, 4, 5 or more restricted flow portions of tubing 410 arranged in parallel. When multiple restricted flow portions of tubing are arranged in parallel, $R_L$ should be taken as the mean restricted flow portion of tubing length 411.

The space between the tube shell and the restricted flow portions of tubing 410 may be filled with a packing material 440. The packing material 440 may be impermeable to fluids. Alternatively, it may be a material restrictive to flow; such as a sponge. The packing material 440 may comprise materials designed to fill a space and then harden, such as hot glue, epoxy, or spray foam.

The flow metering device 110 may comprise more than one restricted flow portion of tubing 310, 410 arranged in series. When multiple restricted flow portions of tubing are arranged in series, $R_L$ should be calculated as the sum of the lengths of each of the restricted flow portions of tubing. For example, the flow metering device may comprise 2, 3, 4, 5 or more restricted flow portions of tubing arranged in series.

As depicted in FIG. 1, the flow metering device 110 may comprise a filter 190 disposed upstream of the restricted flow portion of tubing. For example, the filter may be disposed between the concentrate supply tank 180 and the restricted flow portion of tubing. The filter 190 may have a smaller filtration size than $R_{ID}$. The filter or screen may be positioned within the aspect ratio flow metering device 300, 400 and upstream of the restricted flow portion 310, 410. For example, the screen may be positioned within the concentrate inlet 320, 420. The screen may be positioned between tubing fitting 421 and the restricted flow portions of tubing 310, 410. The purpose of the filter or screen is primarily to remove solid contaminants from the concentrate flow stream before they can enter and clog the restricted flow portions of tubing.

The restricted flow portions of tubing 310, 410 may be substantially linear. Linear restricted flow portions of tubing 310, 410 may be preferred as the absence of corners or kinks helps to prevent the formation of crystals by minimizing nucleation sites.

In alternate embodiments, the restricted flow portions of tubing 310, 410 may not be linear. For example, the restricted flow portions of tubing 310, 410 may be twisted, coiled, pigtailed, or may otherwise have bends or curvature introduced into them. Without being limited by theory, using nonlinear restricted flow portions of tubing 310, 410 is believed to enable an increased restricted flow portion length 311, 411 without substantially increasing the length of the aspect ratio flow metering device 300, 400. For example, when using a nonlinear restricted flow portion of tubing 310, 410, the length of the restricted flow portion of tubing 311, 411 may be altered from 2 in to 50 in, 5 in to 50 in, 10 in to 50 in, 15 in to 50 in, 20 in to 50 in, 2 in to 40 in, 2 in to 35 in, 2 in to 30 in, 2 in to 25 in, 5 in to 35 in, or any combination thereof, without changing the size of the housing.

According to some embodiments, the flow metering device does not include an orifice plate 210 with an orifice diameter 230 less than $R_{ID}$ 312, 412.

In alternate embodiments, an orifice plate 210 may be included with an orifice diameter 230 narrower than the internal diameter of the restricted flow portion of tubing 312, 412. In these cases, the orifice diameter 230 is larger than would otherwise be required to achieve the same concentrate flowrate.

As depicted in FIG. 4, the flow metering device 110, 300, 400 may include tubing fittings 421, 431 on the concentrate inlet 420 and metered concentrate outlet ends 430. Any suitable means for joining tubing may be used, including barbed fittings, threaded fittings, flanges, and press fit connectors.

The system 10 may be used in a variety of applications including in a car wash, a truck wash, a boat wash, a janitorial dilution station, or a detail operation. Further applications include mixing laundry chemicals, industrial dish washing solvents, food process chemicals, chemicals for metal finishing, chemicals for food sanitization, and chemicals for water treatment.

A mechanical vehicular wash may comprise a vehicle entrance leading into a vehicle washing station, a sprayer disposed within the vehicle washing station, a concentrate supply tank 180, a water supply channel, and a hydrodynamic mixing apparatus 100.

The water supply channel may be any device which supplies water to the diluent inlet. For example, the water supply channel may be integrated into a liquid dispensing device such as a pump, a HydroMinder® from HYDROSYSTEMSCO, or a Hydra-flex® pumping station. The water supply channel may be a simpler device such as a spigot or hose. A combination of these devices may be used to supply water to the diluent inlet channel.

The diluent inlet 120 of the hydrodynamic mixing apparatus 100 may be fluidly connected to the water supply channel of the mechanical vehicular wash.

The concentrate inlet portion 330, 430 of the aspect ratio flow metering device may be fluidly connected to the concentrate supply tank 180.

A mixed fluid outlet of the Venturi mixer may be fluidly coupled to the sprayer. As used herein, a "sprayer" may refer to a device used in vehicle cleaning stations also known as an "arch." A sprayer may also refer to any device which forces the mixed fluid though a nozzle, such as a hose sprayer, a pressure washer, or a foam brush.

A method of making a cleaning solution may include passing a diluent through a diluent inlet portion 120 of a hydrodynamic mixing apparatus 100, passing a concentrate through the concentrate inlet portion 170 of a hydrodynamic mixing apparatus 100, mixing the concentrate with the diluent to generate a cleaning solution, and discharging the cleaning solution through a mixed fluid outlet. The concentrate may be mixed with the diluent in the throat portion 140, in the diverging portion 150, or even in the mixed fluid outlet 160.

As used herein "concentrated fluids" or "concentrate" may refer to one or more of a soap, tire and wheel cleaner, foam brush agent, presoak, wax, clearcoat protectant, tire shine solvent, conditioner, total car protectant, high pressure detergent, prep soap, or drying agent. Concentrates may have a concentration greater than the manufacturer recommended concentration for use. For example, concentrates may have a concentration greater than 2×, 4×, 8×, 16×, 32×, 64×, 128×, 256×, 512×, 1024×, 2048×, 2500×, 3000×, 3500×, or 4000× the recommended concentration for use. The quantity of material in a concentrate may further be defined in terms of its specific gravity. For example, the concentrate may have a specific gravity of between 1 and 1000, 1 and 800, 1 and 600, 1 and 400, 1 and 200, 1 and 100, 1 and 75, 1 and 50, 1 and 25, 1 and 10, 1 and 5, 5 and 1000, 5 and 800, 5 and 600, 5 and 400, 5 and 200, 5 and 100, 5 and 75, 5 and 50, 5 and 25, 5 and 10, 10 and 1000, 10 and 800, 10 and 600, 10 and 400, 10 and 200, 10 and 100, 10 and 75, 10 and 50, 10 and 25, 10 and 15, or any combination thereof. The concentrate may be an alkaline, acid, or neutral solution. The concentrate may be a buffered solution. Buffered solutions may be preferred for concentrates as they enable relatively high acid or base concentrations in a dilute solution while still maintaining acceptable pH values in the concentrate itself.

The cleaning solution may have a concentration of 0.5 ml chemical concentrate/gallon diluent (ml/gal) to 100 ml/gal. For example, the cleaning solution may have a concentration of from 0.5 ml/gal to 80 ml/gal, 0.5 ml/gal to 60 ml/gal, 0.5 ml/gal to 40 ml/gal, 0.5 ml/gal to 20 ml/gal, 1 ml/gal to 100 ml/gal, 1 ml/gal to 80 ml/gal, 1 ml/gal to 60 ml/gal, 1 ml/gal to 40 ml/gal, 5 ml/gal to 100 ml/gal, 5 ml/gal to 80 ml/gal, 5 ml/gal to 60 ml/gal, 5 ml/gal to 40 ml/gal, 5 ml/gal to 20 ml/gal, 10 ml/gal to 100 ml/gal, 10 ml/gal to 80 ml/gal, 10 ml/gal to 60 ml/gal, 10 ml/gal to 40 ml/gal, 10 ml/gal to 20 ml/gal, or any combination thereof.

The concentrate solution may have an initial concentration of at least 20 wt. % concentrate. For example, the concentrate solution may have an initial concentration of at least 30 wt. %, at least 40 wt/ %, at least 50 wt. %, at least 60 wt. %, at least 70 wt. %, at least 80 wt. %, at least 90 wt. %, at least 95 wt. %, or even at least 99 wt. % concentrate, or any combination thereof. Alternatively, the concentrate may have an initial concentration of water less than 90 wt. %, less than 80 wt. %, less than 70 wt. %, less than 60 wt. %, less than 50 wt. %, less than 40 wt. %, less than 30 wt. %, less than 20 wt. %, less than 10 wt. %, less than 5 wt. %, or even less than 1 wt. %, or any combination thereof. The initial concentration of the concentrate solution may further be defined in terms of specific gravity. For example, the initial concentration of the concentrate solution may be from 0.1 to 2, 0.25 to 2, 0.5 to 2, 0.75 to 2, 1 to 2, 1.25 to 2, 1.5 to 2, 0.1 to 1.5, 0.1 to 1, 0.1 to 0.5, 0.25 to 2, 0.25 to 1.5, 0.5 to 1.5, 0.75 to 1.25, or any combination thereof.

A flow of concentrate through the metered concentrate outlet portion 320, 420 may be between 0.5 milliliters per minute (ml/min) and 150 ml/min. For example, the flow of concentrate may be from 0.5 ml/min to 125 ml/min, 0.5 ml/min to 100 ml/min, 0.5 ml/min to 75 ml/min, 0.5 ml/min to 50 ml/min, 0.5 ml/min to 25 ml/min, 3 ml/min to 125 ml/min, 3 ml/min to 100 ml/min, 3 ml/min to 75 ml/min, 3 ml/min to 50 ml/min, 3 ml/min to 25 ml/min, 10 ml/min to 150 ml/min, 10 ml/min to 125 ml/min, 10 ml/min to 100 ml/min, 10 ml/min to 75 ml/min, 10 ml/min to 50 ml/min, 10 ml/min to 25 ml/min, 25 ml/min to 150 ml/min, 25 ml/min to 100 ml/min, 25 ml/min to 75 ml/min, 25 ml/min to 50 ml/min, 50 ml/min to 100 ml/min, 50 ml/min to 75 ml/min, or any combination thereof.

A flow of diluent through the diluent inlet portion 120 may be between 1 gallon per minute (GPM) and 10 GPM. As used herein, "diluent" may refer to any fluid used to adjust the concentration of the concentrate. While fresh water may be the most common diluent, other diluents may be used including salt water, brine, alcohols (such as methanol, ethanol, isopropanol, propanol, and butanol), soaps, hydrocarbon fluids (such as kerosene, gasoline, diesel), amino based fluids (such as ammonia). For example, the flow of diluent through the diluent inlet may be between 1 GPM and 8 GPM, 1 GPM and 6 GPM, 1 GPM and 4 GPM, 1 GPM and 2 GPM, 2 GPM and 10 GPM, 2 GPM and 8 GPM, 2 GPM and 6 GPM, 2 GPM and 4 GPM, 4 GPM and 10 GPM, 4 GPM and 8 GPM, 4 GPM and 6 GPM, or any combination thereof.

Diluent may be supplied to the diluent inlet portion 120 at an inlet pressure. The inlet pressure may be achieved through line pressure (from a utility), directly from a pump, from a gravity feed system such as a water tower, or through gas compression of a diluent tank. The inlet pressure may be a pressure sufficient to drive the diluent through the hydrodynamic mixing apparatus 100 at the desired flowrate, such as from 1 PSI to 10,000 PSI, 1 PSI to 5,000 PSI, 1 PSI to 1,000 PSI, 1 PSI to 500 PSI, 1 PSI to 250 PSI, 1 PSI to 150 PSI, 1 PSI to 75 PSI, 1 PSI to 50 PSI, 10 PSI to 10,000 PSI, 10 PSI to 5,000 PSI, 10 PSI to 1,000 PSI, 10 PSI to 500 PSI, 10 PSI to 250 PSI, 10 PSI to 150 PSI, 10 PSI to 75 PSI, 10 PSI to 50 PSI, 50 PSI to 10,000 PSI, 50 PSI to 5,000 PSI, 50 PSI to 1,000 PSI, 50 PSI to 500 PSI, 50 PSI to 250 PSI, 50 PSI to 150 PSI, 50 PSI to 75 PSI, 50 PSI to 50 PSI, 25 PSI to 10,000 PSI, 25 PSI to 5,000 PSI, 25 PSI to 1,000 PSI, 25 PSI to 500 PSI, 25 PSI to 250 PSI, 25 PSI to 150 PSI, 25 PSI to 75 PSI, 25 PSI to 50 PSI, or any combination thereof. As used herein "PSI" refers to the gauge pressure.

A ratio of a flow of diluent to a flow of concentrate may be between 8000:1 and 60:1. The devices and methods of the present disclosure may be particularly suitable to adjust this range. For example, the ratio of the flow of diluent to the flow of concentrate may be from 8000:1 to 100:1, 8000:1 to 500:1, 8000:1 to 1000:1, 8000:1 to 2000:1, 8000:1 to 3000:1, 8000:1 to 5000:1, 6000:1 to 100:1, 6000:1 to 500:1, 6000:1 to 1000:1, 6000:1 to 2000:1, 6000:1 to 4000:1, 4000:1 to 100:1, 4000:1 to 500:1, 4000:1 to 1000:1, 4000:1 to 2000:1, 3790:1 to 80:1, 3790:1 to 100:1, 3790:1 to 150:1, 3790:1 to 200:1, 3790:1 to 300:1, 3790:1 to 500:1, 3790:1 to 750:1, 3790:1 to 1000:1, 3790:1 to 1500:1, 3790:1 to 2000:1, 3000:1 to 60:1, 3000:1 to 100:1, 3000:1 to 500:1, 3000:1 to 1000:1, 3000:1 to 2000:1, 2000:1 to 60:1, 2000:1 to 100:1, 2000:1 to 1000:1, or any combination thereof.

As used herein, the "aspect ratio flow metering device" of the present disclosure may be referred to as a "flow metering device," a "single tube aspect ratio flow metering device," or a "parallel tube aspect ratio flow metering device."

As used herein, the terms "hydraulically connected" and "fluidly connected" both refer the apparatuses in which fluids may flow between one connected component and the other. In many embodiments, the connected components are connected by a pipe or conduit. A hydraulic pressure applied to a fluid that connecting conduit at one component may be detectable at the other component.

It should be understood that while this application is written with specific reference to liquid concentrates and diluents, the principles described herein apply equally well to gaseous concentrates and/or gaseous diluents.

EXAMPLES

To test the effectiveness of the presently disclosed system, an aspect ratio flow metering device was constructed and fluidly connected to the inlet of the Venturi mixer. To provide a comparison, a tip with a 0.03 in diameter orifice was also used.

A 2.25 gallons per minute (GPM) Venturi mixer manufactured by Hydra-Flex model/part 618086/150418 was used for all tests. Water was used as the diluent at either 30 PSI or 240 PSI. The specific concentrate used was RUST-OLEUM® CERTIFIED MOLTEN SEAL CLEARCOAT PROTECTANT BY DUBOIS CHEMICALS INC. with a specific gravity of 0.938.

The aspect ratio flow metering device comprised of two restricted flow portions of tubing arranged in parallel. The diameter of the tubing was 0.03 in and the length varied from 2 in to 48 in.

Figure 5:
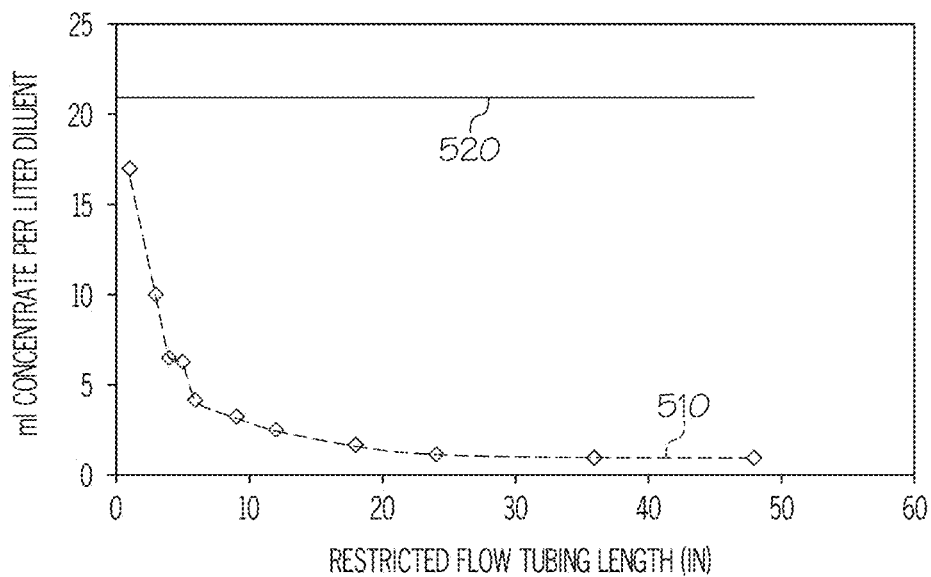
FIG. 5 depicts the effect of increasing lengths of restricted flow portions of tubing on an aspect ratio flow metering device, according to some embodiments of the present disclosure.
Figure 6:
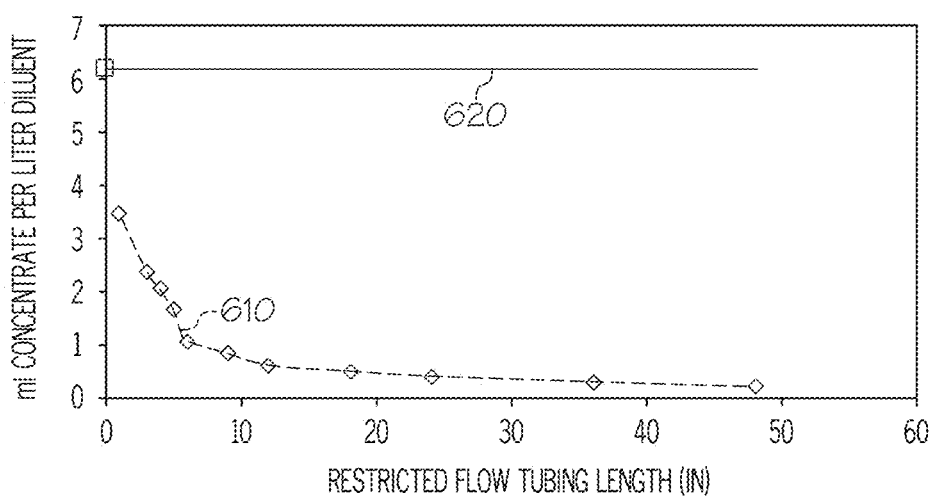
FIG. 6 depicts the effect of increasing lengths of restricted flow portions of tubing on an aspect ratio flow metering device, according to some embodiments of the present disclosure.

FIG. 5 shows the effect of increasing the length of the restricted flow portion of tubing on the flow rate through the aspect ratio flow metering device, when the diluent inlet pressure is 30 PSI (represented by the numeral 510). FIG. 6 shows the effect of increasing the length of the restricted flow portion of tubing on the flow rate through the aspect ratio flow metering device, when the diluent inlet pressure is 240 PSI (represented by the numeral 610). Both FIGS. 5 and 6 include a traditional metering tip with a 0.03 in diameter orifice for comparison (represented by the numeral 520, 620). The X-axis is the length of the restricted flow portion of tubing used (in inches). The Y-axis is the number of milliliters of concentrate per liter of diluent supplied to the Venturi mixer.

As can be seen from FIGS. 5 and 6, the flowrate of concentrate into the Venturi mixer is directly correlated to the length of tubing used, with longer lengths of tubing decreasing the flowrate of the concentrate. The flowrate of concentrate through the standard tip is significantly greater than through the aspect ratio flow metering device at all lengths of tubing and for both pressures. It should be noted that while the tip and each of the restricted flow portions of tubing have equivalent opening diameters, there are two restricted flow portions of tubing arranged in parallel. Thus, when comparing the flowrate through the aspect ratio flow metering device to flow through the tip, the flow through the aspect ratio flow metering device is effectively twice as high as it otherwise would be.

The invention claimed is:

1. An aspect ratio flow metering device comprising
a concentrate inlet portion,
2, 3, 4, or 5 restricted flow portions of tubing arranged in parallel, fluidly connected to the concentrate inlet portion, and
a metered concentrate outlet portion fluidly connected to the 2, 3, 4, or 5 restricted flow portion of tubing, wherein:
the narrowest part of the 2, 3, 4, or 5 restricted flow portions of tubing each having a length ($R_L$): inner diameter ($R_{ID}$) ratio of at least 10:1;
the metered concentrate outlet portion having an inner diameter ($O_{ID}$) greater than $R_{ID}$;
the concentrate inlet portion having an inner diameter ($I_{ID}$) greater than $R_{ID}$;
the length ($R_L$): inner diameter ($R_{ID}$) ratio of at least 10:1 of the 2, 3, 4, or 5 restricted flow portions of tubing is structurally configured to limit flow of a concentrate into a hydrodynamic mixing apparatus; and
the length ($R_L$) is a mean tubing length of the 2, 3, 4, or 5 restricted flow portions arranged in parallel.

2. The aspect ratio flow metering device of claim 1 wherein:
the hydrodynamic mixing apparatus comprises a Venturi mixer;
the Venturi mixer comprises
a diluent inlet portion fluidly coupled to a throat portion,
a mixed fluid outlet fluidly coupled to the throat portion, and
a metered concentrate inlet portion fluidly coupled to the throat portion; and
the metered concentrate outlet portion of the aspect ratio flow metering device is fluidly coupled to the metered concentrate inlet of the Venturi mixer.

3. The aspect ratio flow metering device of claim 2, wherein the system does not contain an orifice plate with an orifice diameter less than $R_{ID}$.

4. A mechanical vehicular wash comprising:
a vehicle entrance leading into a vehicle washing station,
a sprayer disposed within the vehicle washing station,
a concentrate supply tank,
a water supply channel, and
the aspect ratio flow metering device of claim 2, wherein
the diluent inlet portion is fluidly connected to the water supply channel,
the concentrate inlet portion of the aspect ratio flow metering device is fluidly connected to the concentrate supply tank, and
a mixed fluid outlet portion of the Venturi mixer is fluidly connected to the sprayer.

5. A method of making a cleaning solution, the method comprising:
passing a diluent through a diluent inlet portion of the Venturi mixer of claim 2,
passing a concentrate through the concentrate inlet portion of the aspect ratio flow metering device,
mixing the concentrate with the diluent in the throat portion to generate the cleaning solution, and
discharging the cleaning solution through a mixed fluid outlet.

6. The method of claim 5, wherein the concentrate is one or more of a soap, tire and wheel cleaner, foam brush agent, presoak, wax, clearcoat protectant, tire shine solvent, conditioner, total car protectant, high pressure detergent, prep soap, or drying agents.

7. The method of claim 5, wherein the concentrate has a flow rate through the metered concentrate outlet portion of between 0.5 milliliters per minute (ml/min) and 150 ml/min.

8. The method of claim 5, wherein the diluent has a flow rate through the diluent inlet portion of between 1 gallons per minute (GPM) and 10 GPM.

9. The method of claim 5, wherein a ratio of a flow of diluent to a flow of concentrate is between 8000:1 and 60:1.

10. The aspect ratio flow metering device of claim 1, wherein the $R_L$ is between 1 inch (in) and 100 in.

11. The aspect ratio flow metering device of claim 1, wherein the $R_{ID}$ is between 0.020 inches and 0.1 inches.

12. The aspect ratio flow metering device of claim 1 further comprising a filter, wherein:
the filter has a smaller filtration diameter than $R_{ID}$, and
the filter is disposed upstream of the 2, 3, 4, or 5 restricted flow portions of tubing.

13. The aspect ratio flow metering device of claim 1, wherein the aspect ratio flow metering device is used within a car wash, a truck wash, or a janitorial dilution station.

14. An aspect ratio flow metering device comprising
a concentrate inlet portion,
2, 3, 4, or 5 restricted flow portions of tubing arranged in parallel, fluidly connected to the concentrate inlet portion,
a metered concentrate outlet portion fluidly connected to the 2, 3, 4, or 5 restricted flow portions of tubing, and
a Venturi mixer comprising a metered concentrate inlet portion, the metered concentrate inlet portion is fluidly connected to the metered concentrate outlet portion of the 2, 3, 4, or 5 restricted flow portions of tubing, wherein:
the narrowest part of the 2, 3, 4, or 5 restricted flow portions of tubing each having a length ($R_L$): inner diameter ($R_{ID}$) ratio of at least 10:1;
the metered concentrate outlet portion having an inner diameter ($O_{ID}$) greater than $R_{ID}$;
the metered concentrate inlet portion having an inner diameter ($I_{ID}$) greater than $R_{ID}$; and
the length ($R_L$): inner diameter ($R_{ID}$) ratio of at least 10:1 of the 2, 3, 4, or 5 restricted flow portions of tubing is structurally configured to limit flow of a concentrate into a hydrodynamic mixing apparatus;
the metered concentrate outlet of the aspect ratio flow metering device is fluidly connected to a concentrate inlet of the Venturi mixer; and
the length ($R_L$) is a mean tubing length of the 2, 3, 4, or 5 restricted flow portions arranged in parallel.

* * * * *